United States Patent Office 3,274,177
Patented Sept. 20, 1966

3,274,177
METADIOXANE DERIVATIVES OF PREGNANE COMPOUNDS
Katsura Morita, Ikeda, Hayao Nawa, Nishitomatsu, Amagasaki, and Takuichi Miki, Mukosho, Amagasaki, Japan, assignors to Takeda Chemical Industries, Ltd., Higashi-ku, Osaka, Japan
No Drawing. Filed Aug. 1, 1962, Ser. No. 213,885
Claims priority, application Japan, Apr. 25, 1962, 37/17,007
24 Claims. (Cl. 260—239.55)

The present application is a continuation-in-part of application Serial No. 147,183, filed October 24, 1961, now abandoned.

This invention relates to a method for producing metadioxane-type derivatives of 16β,20α-dihydroxylated pregnane compounds and to new products obtained thereby.

It is known that steroid compounds with 1,2-cis-glycol structure react with a carbonyl compound such as formaldehyde or acetone to form the corresponding alkylidene-1,2-cis-dioxy derivatives.

On the other hand, according to the present invention, steroid compounds of the so-called pregnane series and having hydroxyl groups at the positions 16β and 20α give alkylidene-16β,20α-dioxy derivatives forming a metadioxane-ring, when allowed to react with a carbonyl compound in the presence of an acid catalyst, though the structure in the positions 16 and 20 of the said steroid compounds is not 1,2-cis-glycol but 1,3-glycol; and the metadioxane compounds derived from said steroids of the pregnane series having hydroxyl groups at least at the positions 16β and 20α show a remarkable anti-aldosterone effect in vivo.

One of the objects of the present invention is to provide a process for producing new metadioxane derivatives of steroids of the so-called pregnane series and having hydroxyl groups at least at the positions 16β and 20α. The process is useful for the synthesis of steroids as further mentioned hereinafter.

Another object is to provide new anti-aldosterone active compounds which are produced through the process provided by the present invention.

The starting steroid for the process of this invention is a 16β,20α-dihydroxylated steroid belonging to the so-called pregnane series. It is necessary for the starting steroid to have free hydroxyl groups at least at the positions 16β and 20α. The starting steroid may or may not have such substituents and/or functional groups as methyl, ethyl, fluoro, chloro, bromo, iodo, oxo, alkoxyl, acyloxy, nitro, thiocyano, mercapto, alkylthio, double bonds, etc. at a position or positions other than 16β and 20α, and any hydroxyl group or groups attached to a carbon atom or atoms other than at the positions 15 and 21 do not obstruct the progress of the reaction. Some typical examples of the starting steroids are:

pregn-5-ene-3β,16β,20α-triol;
16β,20α-dihydroxypregn-4-en-3-one;
16β,20α-dihydroxy-6α-methylpregn-4-en-3-one;
11β,16β,20α-trihydroxypregn-4-en-3-one;
9α-fluoro-11β,16β,20α-trihydroxypregn-4-en-3-one;
16β,20α-dihydroxy-5β(or 5α)-pregnan-3-one;
16β,20α-dihydroxypregna-1,4-dien-3-one;
16β,20α-dihydroxypregna-4,9(11)-dien-3-one;
pregn-4-ene-3β,16β,20α-triol;
5α-pregnane-3β,5α,6β,16β,20α-pentol;
5α-pregnane-3β,5α,6β,16β,20α-pentol;
5α-pregnane-3β,6α,16β,20α-tetrol;
5α-pregnane-3β,6β,16β,20α-tetrol;
5β-pregnane-3α,16β,20α-triol;
5α-pregnane-3α,16β,20α-triol;
5α-pregnane-3β,16β,20α-triol;
5β-pregnane-3β,16β,20α-triol;
5α,6α-epoxy-5α-pregnane-3β,16β,20α-triol;

or their esters or ethers of a hydroxyl group or hydroxyl groups at a position or positions other than 16β and 20α.

As the said carbonyl compound, a ketone such as acetone, methyl ethyl ketone, diethyl ketone, cyclopentanone or cyclohexanone, an aldehyde such as formaldehyde or acetaldehyde, a carboxylic acid such as formic acid, pyruvic acid, glyoxalic acid, acetoacetic acid, levulinic acid or their esters may be used. In place of these carbonyl compounds, their derivatives such as orthoformic acid ester, ethylenedioxy derivative or cyanhydrine, which are easily changeable into the original carbonyl compound under reaction conditions, can of course be employed.

The reaction is usually accelerated by the presence of dehydrating acid catalyst, which may be, for example, a mineral acid such as hydrochloric acid, hydrobromic acid, hydroiodic acid, sulfuric acid, perchloric acid, periodic acid, or the like; a sulfonic acid such as toluene sulfonic acid, benzene sulfonic acid, methane sulfonic acid, or the like; a so-called Lewis acid such as aluminum chloride, zinc chloride, boron trifluoride, and further it may be acetyl chloride, benzoyl chloride, phosphoryl chloride, phosphorus trichloride, thionyl chloride, chlorosulfonic acid, or the like.

Use of a suitable solvent is effective to make the reaction proceed smoothly. However, the solvent desirably should be anhydrous as far as possible. It is convenient to make use of an excess of the carbonyl compound as the solvent when the carbonyl compound is liquid and rather stable. That is, acetone, methyl ethyl ketone, acetaldehyde, cyclohexanone, ethyl orthoformate, or the like can do duty as a solvent, beside being a reactant. If required, such a routine solvent as an ether, benzene, toluene, petroleum ether, ligroin, benzine, dioxane, tetrahydrofuran, methylene chloride, ethylene chloride, chloroform, or the like may be used.

The metadioxane compounds thus obtained are easily changeable into the corresponding 16β,20α-dihydroxy compounds by the action of an acidic agent in an aqueous medium. Thus, the 16β,20α-dihydroxy compounds and the metadioxane compounds, which are in the relation of the starting materials and the products in the method of the present invention, are interchangeable to each other.

These features provide in the field of synthesizing steroids a new and useful means, which makes it possible to protect or shelter the two free hydroxyl groups at the positions 16β and 20α preferably. That is, when it is desired to subject a steroid having hydroxyl groups at least at the positions 16β and 20α to such a reaction as oxidation, esterification, reduction, etc. without transforming the hydroxyl groups at the positions 16β and 20α, the compound is first subjected to the reaction of the present invention to change it into the corresponding metadioxane compound, which is then subjected to the desired reaction or reactions, and thereafter the transformed metadioxane compound is finally treated with an acid in an aqueous medium to recover the free hydroxyl groups at the positions 16β and 20α.

For example, when it is attempted to produce 16β,20α-dihydroxy-4-pregnen-3-one from 5-pregnene-3β,16β,20α-triol, it is difficult to subject the latter directly to Oppenauer Oxidation, because selective transformation in the ring A may not be expected. However, the difficulty can be removed by subjecting the triol to the reaction of the present invention to protect the hydroxyl groups at the positions 16β and 20α as the corresponding metadioxane compound, which is then subjected to Oppenauer Oxidation, whereupon the selective change from the 5-en-3β-ol into the 4-en-3-one can be effected, and finally the oxidized metadioxane compound is hydrolyzed to obtain the objective 16β,20α-dihydroxy-4-pregnen-3-one.

It is also difficult to esterify selectively the 3β-hydroxyl groups of a 3,16β,20α-trihydroxylated pregnane or pregnene. But if the hydroxyl groups of the positions 16β and 20α in the starting steroid are protected in the form of metadioxane compound, the selective esterification at the position 3 is easy, and hydrolysis of the 3-esterified metadioxane compound with an acid affords the objective 3-monoester. In this case, if it is attempted to protect the trihydroxylated pregnane or pregnane by the usual method of acylation, selective protection is impossible. Thus, the method of the present invention provides a quite advantageous means in steroid syntheses.

The metadioxane compounds thus produced were found to show an anti-aldosterone effect in animal bodies. An example of the pharmacological activity of the objective compounds is shown below.

Isopropylidene - 16β,20α - dioxy - 5α - pregnan-3β-ol, a typical compound of products of the present process, was tested as to its anti-aldosterone activity. Twenty-four hours before being adrenalectomized, rats (Donryu race) were fed with 1.0% aqueous sodium chloride solution. To the adrenalectomized rats were administered 0.8 milligram of the test compound per os, 0.3 microgram of aldosterone subcutaneously and 4.0 cubic centimeters of 0.9% aqueous sodium chloride solution per os, respectively, and it was found that the test compound has a remarkable effect to improve the ratio of the quantity of excreted sodium ion in urine to that of excreted potassium ion. It was also observed that the degree of the activity is at least equivalent or superior to that of aldactone which has been regarded as the most effective one among steroidal anti-aldosterone agents.

The following examples represent presently-preferred illustrative embodiments of the present invention, but are not limitative of the invention at all. In the examples, the relation of parts by weight to parts by volume is the same as that of grams to cubic centimeters. All temperatures are uncorrected.

Example 1

To a mixture of 50 parts by volume of acetone and 0.5 part by volume of 37% solution of boron trifluoride in ether was added 0.5 part by weight of pregn-5-ene-3β, 16β,20α-triol and the mixture was agitated for several minutes, whereupon crystals of the starting steroid were dissolved, and the solution was then allowed to stand for 30 minutes at room temperature (15 to 30° C.). To the solution was added 0.5 part by volume of pyridine, and the mixture was concentrated under reduced pressure to about half the original volume, whereupon crystals separated. Water was added to the mixture, and the crystals separated were collected by filtration, washed with methanol and dried to give 0.57 part by weight of isopropylidene - 16β,20α - dioxypregn-5-en-3β-ol, which showed the following characteristics:

Melting point: 205–206° C.
Specific rotation: $[\alpha]_D^{21} = -69°$ (c.=0.5%, in ethanol)
Elementary analysis.—Calcd. for $C_{24}H_{38}O_3$: C, 76.96; H, 10.23. Found: C, 76.71; H, 10.10.

Example 2

To a mixture of 50 parts by volume of acetone and 0.2 part by volume of 37% solution of boron trifluoride in ether was added 3.5 parts by weight of 5α-pregnane-3β, 5α,6β,16β,20α-pentol, and the mixture was agitated, whereupon crystals of the starting steroid dissolved gradually, and leaflet crystals separated out. After agitation for 1 hour, the crystals were collected by filtration, washed with acetone and dried to give 3.0 parts by weight of crsytals of isopropylidene-16β,20α-dioxy - 5α - pregnane-3β,5α,6β-triol, which showed the following characteristics:

Melting point: 268–269° C.
Elementary analysis.—Calcd. for $C_{24}H_{40}O_5$: C, 70.55; H, 9.87. Found: C, 70.31; H, 9.84.

Example 3

To a mixture of 100 parts by volume of acetone and 0.5 part by volume of an ethereal solution of boron trifluoride was added 3.0 parts by weight of 5α-pregnane-3β, 16β,20α-triol, and the mixture was agitated for 20 minutes at room temperature, whereupon crystals separated. The crystals were collected by filtration and recrystallized from methanol to give 2.7 parts by weight of needle crystals of isopropylidene-16β,20α-dioxy - 5α - pregnan-3β-ol, which showed the following characteristics:

Melting point: 225–226° C.
Specific rotation: $[\alpha]_D^{22} = -11°$ (c.=0.5%, in ethanol)
Elementary analysis.—Calcd. for $C_{24}H_{40}O_3$: C, 76.55; H, 10.71. Found: C, 76.35; H, 10.76.

To a solution of 10 parts by weight of isopropylidene-16β,20α - dioxy - 5α - pregnan-3β-ol in 500 parts by volume of cyclohexanone was added 5 parts by weight of aluminum isopropoxide and the mixture was refluxed in an oil bath for 2 hours. After cooling, the solution was washed twice with 10% aqueous solution of sodium hydroxide and then twice with water, and the solvent was evaporated under reduced pressure. The residue was dissolved in ethylene chloride and then allowed to pass through a column of 50 parts by weight of Florisil—a synthesized magnesium silicate—and finally recrystallized from isopropylether to yield 7 parts by weight of isopropylidene-16β,20α-dioxy - 5α - pregnan - 3 - one, which melted at 215–218° C.

Elementary analysis.—Calcd. for $C_{24}H_{38}O_3$: C, 76.86; H, 10.23. Found: C, 76.78; H, 10.22.

A solution of 10 parts by weight of afore-obtained isopropylidene-16β,20α-dioxy-5α-pregnan-3β-ol in a mixture of 50 parts by volume of pyridine and 20 parts by volume of acetic anhydride was allowed to stand at room temperature for 24 hours. The solvent was evaporated under reduced pressure and the residue was recrystallized from methanol to yield 11 parts by weight of isopropylidene-16β,20α-dioxy-3β-acetoxy-5α-pregnane melting at 191–192° C.

Elementary analysis.—Calcd. for $C_{26}H_{42}O_4$: C, 74.64; H, 10.05. Found: C, 74.42; H, 10.35.

One part by weight of isopropylidene - 16β,20α-dioxy-3β-acetoxy-5α-pregnane thus obtained was dissolved in a mixture of 10 parts by volume of acetic acid and 5 parts by volume of water, and the solution was heated on a steam bath for 2 hours. After chilling and careful addition of water, the reaction mixture separated crystals of 3β-acetoxy-5α-pregnane-16β,20α-diol, which were filtered, dried and recrystallized from methanol to yield 0.8 part by weight of platelets melting at 200° C.

Elementary analysis.—Calcd. for $C_{23}H_{38}O_4$: C, 73.02; H, 10.05. Found: C, 72.81; H, 10.02.

Example 4

To a mixture of 100 parts by volume of acetone and 0.5 part by volume of 37% solution of boron trifluoride in ether was added 3.5 parts by weight of 16β,20α-dihydroxypregn-4-en-3-one, and the mixture was agitated for 30 minutes at room temperature. To the mixture was added 0.5 part by volume of pyridine and the whole concentrated. On addition of water to the concentrated solution crystals separated, which were collected by filtration and recrystallized from isopropyl ether to give 3.0 parts by weight of pillar crystals of isopropylidene-16β,-20α-dioxypregn-4-en-3-one, which showed the following characteristics:

Melting point: 180–182° C.
Specific rotation: $[\alpha]_D^{22} = +55°$ (c.=0.5%, in chloroform).
Elementary analysis.—Calcd. for $C_{24}H_{36}O_3$: C, 77.37; H, 9.74. Found: C, 77.30; H, 10.00.

Example 5

In 15 parts by volume of acetone was suspended 0.1 part by weight of 5α-pregnane-3β,5α,6β,16β,20α-pentol, and 1 drop of concentrated hydrochloric acid per 0.1 part of pentol was added thereto. During subsequent agitation of the mixture, crystals of the starting steroid were dissolved. The solution was allowed to stand for 30 minutes. To the mixture was added 1 drop of pyridine per drop of previously added acid, and the mixture was concentrated to give crystals, which were collected by filtration, washed with water and with acetone and then dried to give 0.9 part by weight of crystals of isopropylidene-16β,20α-dioxy-5α-pregnane-3β,5α,6β-triol, which melts at 268–269° C.

Example 6

To a mixture of 30 parts by volume of acetone and 0.1 part by volume of 37% solution of boron trifluoride in ether was added 0.23 part by weight of 5α-pregnane-3β,6β,16β,20α-tetrol, and the mixture was agitated, whereupon crystals of the starting steroid dissolved. The solution was allowed to stand for 30 minutes. Then 1 part by volume of pyridine was added to the solution, and the acetone was evaporated under reduced pressure. To the residue was added water, whereupon crystals separated out, which were collected by filtration, washed with water, dried and recrystallized from a mixture of methanol and acetone to give 0.21 part by weight of isopropylidene-16β,20α-dioxy-5α-pregnane-3β,6β-diol, which showed the following characteristics:

Melting point: 262–264° C.

Elementary analysis.—Calcd. for $C_{24}H_{40}O_6$: C, 73.43; H, 10.27. Found: C, 73.20; H, 10.35.

0.6 part by weight of the above-obtained product was heated at 80° C. for 3 hours with a mixture of 20 parts by volume of pyridine and 10 parts by volume of acetic anhydride. The reaction mixture was treated in the usual manner for isolation of steroid compounds obtained as a resinous substance. This substance was heated together with a mixture of 70 parts by volume of methanol, 1 part by volume of water and 0.5 part by weight of potassium hydroxide under reflux for 3 hours, and the reaction mixture was again treated in the usual manner for purification to give crude crystals, which were recrystallized from acetone to give 0.45 part by weight of the corresponding monoacetate, which showed the following characteristics:

Melting point: 190–191° C.

Elementary analysis.—Calcd. for $C_{26}H_{42}O_5$: C, 71.85; H, 9.74. Found: C, 71.66; H, 9.70.

Example 7

In 20 parts by volume of acetone was suspended 0.12 part by weight of 5α-pregnane-3β,6α,16β,20α-tetrol, and 1 drop of concentrated hydrochloric acid was added thereto for every 20 parts of acetone. The mixture was heated on a water bath under agitation, whereupon crystals of the starting steroid dissolved. The solution was then allowed to stand for 30 minutes, and pyridine was added. The mixture was concentrated to separate crystals. The crystals were collected by filtration, and recrystallized from a mixture of water, acetone and methanol to give 0.1 part by weight of isopropylidene-16β,20α-dioxy-5α-pregnane-3β,6α-diol, which showed the following characteristics:

Melting point: 268–270° C.

Elementary analysis.—Calcd. for $C_{24}H_{40}O_4$: C, 73.43; H, 10.27. Found: C, 73.56; H, 10.05.

The product was acetylated with acetic anhydride and pyridine to give the corresponding diacetate, which showed the following characteristics:

Melting point: 167–169° C.

Elementary analysis.—Calcd. for $C_{28}H_{44}O_6$: C, 70.55; H, 9.31. Found: C, 70.41; H, 9.34.

Example 8

In 35 parts by volume of acetone was suspended 0.1 part by weight of 5α-pregnane-3β,5α,16β,20α-tetrol, and 4 drops of 47% solution of boron trifluoride in ether was added thereto. The mixture was kept at 30° C. for 2.5 hours under agitation, whereupon needle crystals separated out, which were collected by filtration and recrystallized from a mixture of chloroform and acetone to give 0.08 part by weight of isopropylidene-16β,20α-dioxy-5α-pregnane-3β,5α-diol, which showed the following characteristics:

Melting point: 268–272° C.

Elementary analysis.—Calcd. for $C_{24}H_{40}O_4$: C, 73.43; H, 10.27. Found: C, 73.10; H, 10.42.

Example 9

A suspension of 10 parts by weight of 5α-pregnane-3β,16β,20α-triol, 200 parts by volume of butan-2-one and 2 parts by volume of 37% solution of boron trifluoride in ether was stirred at room temperature for 4 hours. Two parts by volume of pyridine was added and the reaction mixture was diluted with water to afford a crystalline product, which was filtered, dried and recrystallized from a mixture of methylene chloride and methanol to yield 6 parts by weight of 2-butylidene-16β,20α-dioxy-5α-pregnan-3β-ol melting at 194–201° C. Elementary analysis showed that the compound thus obtained contains a half mole of methanol as methanol of crystallization.

Elementary analysis.—Calcd. for $C_{25}H_{42}O_3 \cdot \frac{1}{2}CH_3OH$: C, 75.38; H, 10.91. Found: C, 75.26; H, 10.88.

Example 10

A suspension of 10 parts by weight of 5α-pregnane-3β,16β,20α-triol in 200 parts by volume of cyclohexanone containing 2 parts by volume of 37% solution of boron trifluoride in ether was stirred at room temperature for 4 hours. During this period there precipitated a colloidal substance, which was filtered, dried and recrystallized from a mixture of methylene chloride and ethanol to yield 9 parts by weight of cyclohexylidene-16β,20α-dioxy-5α-pregnan-3β-ol melting at 197–201° C. Elementary analysis showed that the compound thus obtained involves a half mole of ethanol as ethanol of crystallization.

Elementary analysis.—Calcd. for $C_{27}H_{44}O_3 \cdot \frac{1}{2}C_2H_5OH$: C, 76.49; H, 10.78. Found: C, 76.08; H, 10.61.

Example 11

A suspension of 10 parts by weight of pregn-5-ene-3β,16β,20α-triol, 500 parts by volume of acetone and 2 parts by volume of 37% solution of boron trifluoride in ether was stirred at room temperature for 2 hours. During the period the crystals of the starting steroid disappeared, and a new crystalline substance precipitated, which was filtered, dried and recrystallized from a mixture of methylene chloride and methanol to yield 10 parts by weight of pure crystals of isopropylidene-16β,20α-dioxypregn-5-en-3β-ol melting at 203–205° C.

Elementary analysis.—Calcd. for $C_{24}H_{38}O_3$: C, 76.96; H, 10.23. Found: C, 76.71; H, 10.10.

To a solution of 10 parts by weight of above-obtained isopropylidene-16β,20α-dioxypregn-5-3β-ol in 500 parts by volume of cyclohexanone was added 5 parts by weight of aluminum isopropoxide and the mixture was refluxed in an oil bath for 2 hours. After cooling, the solution was washed twice with 10% aqueous solution of sodium hydroxide and twice with water, and then the solvent was evaporated under reduced pressure. A solution of the residue in ethylene chloride was allowed to pass through a column of 50 parts by weight of Florisil—a synthesized magnesium silicate—and the product thus obtained was crystallized from isopropylether to yield 7 parts by weight of isopropylidene-16β,20α-dioxypregn-4-en-3-one which melted at 182–184° C.

Elementary analysis.—Calcd. for $C_{24}H_{36}O_3$: C, 77.38; H, 9.74. Found: C, 77.30; H, 10.04.

A suspension comprising 1 part by weight of isoproplyidene-16β,20α-dioxypregn-4-en-3-one, 10 parts by volume of acetic acid and 5 parts by volume of water was heated on a steam bath for 2 hours. After cooling and careful addition of water, the reaction mixture separated crystals of 16β,20α-dihydroxypregn-4-en-3-one, which were filtered, dried and recrystallized from isopropylether to yield 0.7 part by weight of needles melting at 189° C.

*Elementary analysis.*—Calcd. for $C_{21}H_{32}O_3$: C, 75.86; H, 9.70. Found: C, 75.26; H, 9.55.

Example 12

To a mixture of 0.5 part by weight of 3β-acetoxy-5α-pregnane-16β,20α-diol and 5 parts by volume of ethyl orthoformate, there was added a drop of 40% solution of boron trifluoride in ether for each 5 parts by volume of orthoformate. The mixture was stirred for several minutes at room temperature to dissolve crystals of the starting steroid. After the reaction mixture was allowed to stand for further 10 minutes, a few drops of pyridine were added to the mixture, followed by the addition of water, and the whole mixture was extracted with ether. The ethereal extract was washed with water, dehydrated and concentrated. To the concentrate was added methanol to give crystals, which were filtered and recrystallized from a mixture of methylene chloride and methanol to give 0.45 part by weight of ethoxy-methylene-16β,20α-dioxy-3β-acetoxy-5α-pregnane which showed the following characteristics:

Melting point: 163–165° C.

*Elementary analysis.*—Calcd. for $C_{26}H_{42}O_5$: C, 71.85; H, 9.74. Found: C, 72.13; H, 9.76.

Example 13

To a solution of 1 part by weight of 3β-acetoxypregn-5-ene-16β,20α-diol and 8 parts by volume of ethyl orthoformate in 50 parts by volume of benzene was added 0.05 part by weight of p-toluene sulfonic acid and the solution was heated on the water bath to be concentrated until its volume became about one third. To the concentrated solution was added a small amount of pyridine. Then the mixture was cooled, washed with water, dehydrated and concentrated under reduced pressure to remove benzene. The residue was recrystallized from methanol to give 0.7 part by weight of ethoxymethylene-16β,20α-dioxy-3β-acetoxypregn-5-ene, which showed the following characteristics:

Melting point: 102–103° C.

*Elementary analysis.*—Calcd. for $C_{26}H_{40}O_5$: C, 72.22; H, 9.26. Found: C, 72.51; H, 9.26.

Example 14

One part by weight of 5α-pregnane-3β,16β,20α-triol was mixed with 1 part by volume of 40% aqueous formaldehyde solution and 2 parts by volume of concentrated hydrochloric acid, and the mixture was stirred for about one hour. The reaction mixture was extracted with methylene chloride, and the methylene chloride extract was washed with water and concentrated to give 0.8 part by weight of methylene - 16β,20α - dioxy-5α-pregnan-3β-ol, melting at 191–194° C.

Example 15

To a mixture of 0.1 part by weight of pregn-4-ene-3β,16β,20α-triol and 35 parts by volume of acetone was added 4 drops of 47% solution of boron trifluoride in ether, and the mixture was stirred for 30 minutes. After the addition of 0.1 part by volume of pyridine, the reaction mixture was concentrated under reduced pressure. The residue was filtered to collect crystals, which were washed with water and recrystallized repeatedly from methanol to give 0.08 part by weight of isopropylidene-16β,20α-dioxypregn-4-en-3β-ol showing the following characteristics:

Melting point: 166–169° C.

*Elementary analysis.*—Calcd. for $C_{24}H_{38}O_3$: C, 76.96; H, 10.23. Found: C, 77.06; H, 10.27.

Example 16

A half part by weight of pregn-5-ene-3β,16β,20α-triol was suspended in 5 parts by volume of levulinic acid and a few drops of 40% solution of boron trifluoride in ether was added to the suspension. The mixture was stirred for 2 hours at 30° C. and then was poured into water. The resulting crystals were collected and recrystallized from an aqueous methanol to give 0.2 part by weight of 4'-carboxybut-2'-ylidene-16β,20α-dioxypregn-5-en-3β - ol, melting at 228–230° C.

Example 17

Into 2.4 parts by weight of ethyl levulinate was added 3 parts by weight of 5α-pregnane-3β,5α,6α,16β,20α-pentol and several drops of 40% solution of boron trifluoride in ether was added to the mixture. The mixture was stirred for 10 minutes at 40° C. and then was poured into water. The resulting oily material was extracted with ether. The ethereal extract was washed with water and concentrated under reduced pressure to give crystals, which were recrystallized from an aqueous acetone to give 2 parts by weight of 4'-ethoxycarbonylbut-2'-ylidene-16β,20α-dioxy-5α-pregnane-3β,5α,6α-triol, melting at 115–117° C.

What is claimed is:

1. A process for producing a metadioxane derivative of the pregnane series, which comprises allowing a steroid of the pregnane series and having hydroxyl groups at the positions 16β and 20α but not at the positions 15β, 17 and 21 to react with a member selected from the class consisting of ketones, aldehydes and (lower)alkyl orthoformate in the presence of a dehydrating acid catalyst.

2. The process as claimed in claim 1, wherein the acid catalyst is boron trifluoride.

3. The process as claimed in claim 1, wherein the acid catalyst is concentrated hydrochloric acid.

4. A process for producing a metadioxane derivative of the pregnane series, which comprises allowing a steroid of the pregnane series and having the atomic grouping

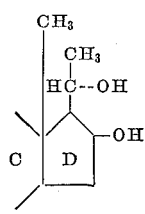

to react with a compound of the formula of $R^1$—CO—$R^2$, wherein $R^1$ and $R^2$ are selected from the class consisting of hydrogen, lower alkyl, carboxy-(lower)-alkyl, (lower) alkoxycarbonyl-(lower)alkyl, and polymethylene showing both $R^1$ and $R^2$ and lower alkyl orthoformates, in the presence of a dehydrating acid catalyst.

5. The process as claimed in claim 4, wherein the acid catalyst is boron trifluoride.

6. The process as claimed in claim 4, wherein the acid catalyst is concentrated hydrochloric acid.

7. The process as claimed in claim 4, wherein the starting steroid is a compound of the formula

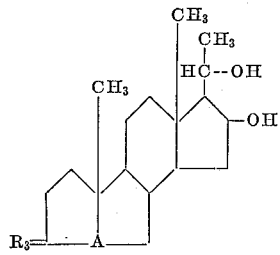

wherein $R^3$ is selected from the class consisting of hydroxyl together with hydrogen, lower aliphatic acyloxy together with hydrogen, and oxo; and is selected from the class consisting of

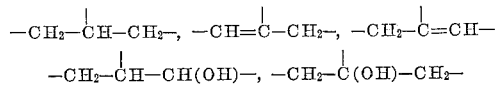

and

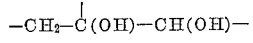

8. A compound of the formula

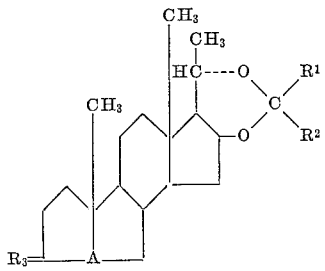

wherein $R^1$ and $R^2$ are selected from the class consisting of hydrogen, loweralkyl having not more than five carbon atoms, a carboxy-(lower)alkyl having not more than five carbon atoms, (lower)alkoxycarbonyl-(lower)alkyl of which the lower alkoxy has up to two carbon atoms and the lower alkyl has up to four carbon atoms, lower alkoxy having not more than two carbon atoms and a polymethylene having from four to five carbon atoms, said polymethylene including both $R^1$ and $R^2$; $R^3$ is selected from the class consisting of hydroxyl together with hydrogen, a lower aliphatic acyloxy together with hydrogen, and oxo; and $$-\overset{|}{A}-$$

is selected from the class consisting of

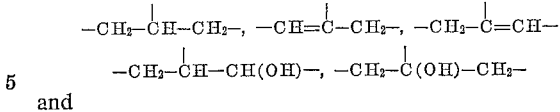

and

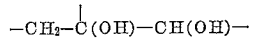

9. Isopropylidene-16β,20α-dioxy-5α-pregnan-3β-ol.
10. Isopropylidene-16β,20α-dioxypregn-4-en-3-one.
11. Isopropylidene-16β,20α-dioxy-5α-pregnane - 3β,5α-diol.
12. Isopropylidene - 16β,20α-dioxy-5α-pregnane-3β,6β-diol.
13. Isopropylidene - 16β,20α-dioxy-5α-pregnane-3β,6α-diol.
14. Isopropylidene - 16β,20α-dioxy-5α-pregnane-3β,5α,6β-triol.
15. 2-butylidene-16β,20α-dioxy-5α-pregnan-3β-ol.
16. Cyclohexylidene-16β,20α-dioxy-5α-pregnan-3β-ol.
17. Isopropylidene-16β,20α-dioxy-5α-pregnan-3-one.
18. Isopropylidene - 16β,20α-dioxy-3β-acetoxy-5α-pregnane.
19. Ethoxymethylene - 16β,20α - dioxy - 3β-acetoxy-5α-pregnane.
20. Ethoxymethylene - 16β,20α-dioxy-3β-acetoxypregn-5-ene.
21. Methylene-16β,20α-dioxy-5α-pregnan-3β-ol.
22. Isopropylidene-16β,20α-dioxypregn-4-en-3β-ol.
23. 4' - carboxybut-2'-ylidene-16β,20α-dioxypregn-5-en-3β-ol.
24. 4' - ethoxycarbonylbut - 2' - ylidene-16β,20α-dioxy-5α-pregnane-3β,5α,6α-triol.

No references cited.

LEWIS GOTTS, *Primary Examiner.*

MORRIS LIEBMAN, *Examiner.*

G. E. LANDE, *Assistant Examiner.*